(12) United States Patent
Feng et al.

(10) Patent No.: US 12,429,391 B2
(45) Date of Patent: Sep. 30, 2025

(54) SYSTEMS AND METHODS FOR MEASURING TENSION DISTRIBUTION IN WEBS OF ROLL-TO-ROLL PROCESSES

(71) Applicant: Purdue Research Foundation, West Lafayette, IN (US)

(72) Inventors: Dan Feng, Anhui (CN); Ryan Wagner, Lafayette, IN (US); Arvind Raman, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 84 days.

(21) Appl. No.: 18/002,364

(22) PCT Filed: Apr. 5, 2022

(86) PCT No.: PCT/US2022/023430
§ 371 (c)(1),
(2) Date: Dec. 19, 2022

(87) PCT Pub. No.: WO2022/216673
PCT Pub. Date: Oct. 13, 2022

(65) Prior Publication Data
US 2024/0027291 A1    Jan. 25, 2024

Related U.S. Application Data

(60) Provisional application No. 63/170,568, filed on Apr. 5, 2021.

(51) Int. Cl.
*G01L 5/04* (2006.01)
*B65H 23/04* (2006.01)

(52) U.S. Cl.
CPC ............ *G01L 5/042* (2013.01); *B65H 23/044* (2013.01); *G01L 5/045* (2013.01); *B65H 2553/30* (2013.01)

(58) Field of Classification Search
CPC ......... G01L 5/042; G01L 5/045; G01L 5/105; B65H 23/044; B65H 2553/30;
(Continued)

(56) References Cited

U.S. PATENT DOCUMENTS 3,031,152 A   4/1962   Cohen et al.
4,109,520 A   8/1978   Eriksson
(Continued)

FOREIGN PATENT DOCUMENTS

JP   2005337846   12/2005
JP   2017161383    9/2017
(Continued)

OTHER PUBLICATIONS

English Machine Translation of Lee et al., KR 20150043680 (Year: 2015).*

(Continued)

*Primary Examiner* — David Z Huang
(74) *Attorney, Agent, or Firm* — Hartman Global IP Law; Gary M Hartman; Domenica N. S. Hartman

(57) ABSTRACT

Systems and methods for measuring web tension distribution in roll-to-roll processes, for example, such as R2R processes employed in the fabrication of printed devices. Such systems and methods entail a web that travels between first and second rollers in a longitudinal direction of the web, inducing tension in the web in the longitudinal direction thereof such that tension is present in a flexible substrate of the web between the first and second rollers, and operating the system to determine an average tension and linear variation of tension present in the flexible substrate resulting from the tension induced in the web inducing a nonuniform tension distribution in the flexible substrate between the first (Continued)

and second rollers. The systems and methods utilize one or more devices that induce deflection in the web between the first and second rollers.

16 Claims, 14 Drawing Sheets

(58) Field of Classification Search
CPC ........ B65H 2557/2423; B65H 23/0204; B65H 2515/314; B65H 2557/64; B65H 2701/1942; B65H 18/103; B65H 2701/19
See application file for complete search history.

(56) References Cited

U.S. PATENT DOCUMENTS

| | | | |
|---|---|---|---|
| 4,235,102 A | | 11/1980 | Karlsson et al. |
| 4,496,428 A | * | 1/1985 | Wells .................. B65H 23/105 356/3.04 |
| 4,655,093 A | * | 4/1987 | Strom .................... G01L 5/042 73/DIG. 1 |
| 4,794,802 A | * | 1/1989 | Felix ...................... D03D 49/04 73/862.41 |
| 4,833,928 A | | 5/1989 | Luukkala et al. |
| 2011/0147115 A1 | | 6/2011 | Ertl |
| 2014/0039822 A1 | | 2/2014 | Logothetidis |
| 2024/0027290 A1 | * | 1/2024 | Feng .................... B65H 23/044 |

FOREIGN PATENT DOCUMENTS

| | | | |
|---|---|---|---|
| JP | 2018079590 | | 5/2018 |
| JP | 2024528361 | | 7/2024 |
| KR | 20150043680 A | * | 4/2015 |
| WO | 2022216669 | | 10/2022 |

OTHER PUBLICATIONS

International Search Report & Written Opinion for International Application No. PCT/US2022/023430, dated Jul. 8, 2022, 13 pages.
Yan, J. et al., "Real-Time Web Tension Prediction Using Web Moving Speed and Natural Vibration Frequency", Meas. Sci. Technol. 31, (2020), 12 pages.
Extended European Search Report for European Patent Application No. 22/785,276, dated Sep. 3, 2024, 6 pages.
Extended European Search Report for European Application No. 22785273.8, dated Nov. 12, 2024 (6 pages).
Notice of Reasons for Refusal for Japanese Patent Application No. 2023-560865, dated Dec. 3, 2024 (10 pages).

* cited by examiner

FIG. 11 - Table 1

| | simulation and experimental cross validations with 2.34 kg hanging mass | experimental cross validations with 2.85 kg hanging mass | in-line measurements |
|---|---|---|---|
| $L^{(1)}$ | 228.60 mm | 152.40 mm | 292.10 mm (Span 1) 107.95 mm (Span 2) |
| $b^{(1)}$ | 228.60 mm | | |
| $\rho_{web}^{(1)}$ | 178.67 g m$^{-2}$ | | 111.18 g m$^{-2}$ |
| $h^{(2)}$ | 127 µm | | 76.2 µm |
| $E^{(2)}$ | | 4.8 GPa | |
| $v^{(3)}$ | | 0.33 | |
| air pressure $^{(1)}$ | 102.67 kPa | 101.84 kPa | 102.71 kPa |
| air temperature $^{(1)}$ | | 21 °C | |
| relative humidity $^{(1)}$ | 68% | 76% | 43% |
| $\rho_{air}^{(4)}$ | 1.208 kg m$^{-3}$ | 1.198 kg m$^{-3}$ | 1.212 kg m$^{-3}$ |

FIG. 12 - Table 2

| Line speed (m min$^{-1}$) | Normalized line speed | $f_{11}$ (Hz) | $f_{12}$ (Hz) | $N_{11}^{raw}$ (N m$^{-1}$) | $\sigma^2$ | Real($2\sigma$) |
|---|---|---|---|---|---|---|
| Span 1, $L = 292.1$ mm, $b = 152.4$ mm | | | | | | |
| 0 | 0 | 60.37±0.00 | 73.20±0.00 | 319.08 | 0.0316 | 0.3558 |
| 0.98 to 1.26 | 2.92×10$^{-4}$ to 3.76×10$^{-4}$ | 63.45±0.11 | 75.98±0.04 | 347.30 | 0.0180 | 0.2680 |
| 1.93 to 2.24 | 5.77×10$^{-4}$ to 6.70×10$^{-4}$ | 63.09±0.04 | 75.90±0.18 | 345.25 | 0.0229 | 0.3029 |
| Span 2, $L = 107.95$ mm, $b = 152.4$ mm | | | | | | |
| 0 | 0 | 165.57±0.00 | 178.65±0.00 | 250.62 | -0.0029 | 0 |
| 1.07 to 1.31 | 3.77×10$^{-4}$ to 4.61×10$^{-4}$ | 164.54±0.02 | 178.56±0.03 | 249.05 | -0.0002 | 0 |
| 1.85 to 2.22 | 6.52×10$^{-4}$ to 7.82×10$^{-4}$ | 164.47±0.06 | 178.53±0.01 | 248.91 | -0.0001 | 0 |

SYSTEMS AND METHODS FOR MEASURING TENSION DISTRIBUTION IN WEBS OF ROLL-TO-ROLL PROCESSES

CROSS-REFERENCE TO RELATED APPLICATIONS

This application claims priority to International Patent Application No. PCT/US2022/23430 filed Apr. 5, 2022, which claims the benefit of U.S. Provisional Application No. 63/170,568 filed Apr. 5, 2021. The contents of these prior patent documents are incorporated herein by reference.

BACKGROUND OF THE INVENTION

The present invention generally relates to systems and methods of flexible printed electronics manufacturing, including but not limited to the fabrication of electronic, optical, and optoelectronic devices such as thin film transistors, supercapacitors, organic light emitting diodes, solar cells, antennas, and sensors. The invention particularly relates to systems and methods capable of promoting the quality and yield of printed devices fabricated by flexible printed electronics manufacturing using roll-to-roll (R2R) processes.

There are ongoing efforts to develop the ability to manufacture relatively low-cost electronic, optical, and optoelectronic devices that can be produced at mass volumes and widely deployed. One such approach is to manufacture such devices using a roll-to-roll (R2R) system (also known as web processing, or reel-to-reel processing). Generally, a R2R process fabricates devices by printing or otherwise applying parts or an entire device on a flexible substrate (sometimes referred to herein as a web), for example, a plastic film or metal foil, which is dispensed from a roll into the R2R system and then re-reeled into a roll at the end of the R2R process. Thin film transistors, supercapacitors, organic light emitting diodes, solar cells, antennas, and sensors are notable but nonlimiting examples in which R2R processes are employed with the intent of providing low-cost, high-throughput, and large-scale manufacturing capabilities. A barrier in the scalability of R2R flexible electronics is low device yield rate in fabrication, which requires costly post-process product testing to control. Maximizing the yield rate often entails modeling and control of processes, in-line metrology, in-line characterization, and effective utilization of new materials.

Stresses in flexible devices fabricated by R2R processes arise during manufacturing due to a combination of web tension and process-induced stresses from printing (for example, ink jetting, gravure, screen, and slot-die), chemical vapor deposition, laser/heat annealing, ultraviolet (UV) curing, and/or hot embossing. Such combined stresses are significant in R2R-manufactured devices since the webs on which they are fabricated are flexible substrates (as nonlimiting examples, polyethylene terephthalate (PET), polyethylene naphthalate (PEN), and polyimide (PI)) that can experience large strains, unlike rigid device substrates such as silicon wafers used for integrated circuit fabricating. The flexibility of webs commonly used in R2R processes results in the webs being prone to nonuniform stresses induced as a result of nonuniform friction between the web and rollers, roller-web misalignment, and roller-roller misalignment. When a web in which stresses were induced during device fabrication is diced or cut to release its flexible devices, the stresses present in the web result in the presence of residual stresses in their devices. The performance of a printed electronic device can depend on residual stresses. Thus, a nonuniform tension distribution within a web can lead to nonuniform device performance crossing the width of web, or worse, to web wrinkling. Monitoring and correcting for nonuniform web tension are important considerations to understand the residual stresses, which can help in feedback quality control of R2R processes to maximize device yields.

Various types of systems and methods have been reported for measuring web tension in R2R systems. Rollers equipped with instrumentation to measure web tension (commonly referred to as instrumented rollers) are well-known examples of such systems and methods. Under the presumption that a uniform tension exists in the web, instrumented rollers often employ tension sensors, such as load cells or dancer systems, with speed sensors to measure and control web tension with velocity. U.S. patent application Publication No. United States Patent Application 2007/0006644 to Schultheis discloses a method of measuring web tension using a pressure sensor wound on a roller. Disadvantages to the use of instrumented rollers include the requirement to investment in customized rollers and to perform recalibration when the web path changes. Moreover, the measurement of web tension in R2R systems using instrumented rollers presumes that the tension in the web wrapped around the roller is unchanged by the friction. In addition, sensors utilized by instrumented rollers are prone to drifting and are sensitive to environmental temperatures and vibrations.

Other approaches reported for monitoring web tension in R2R systems utilize fundamental vibration frequency measurements to infer web tension. However, such methods do not take into consideration the presence of a non-uniform web tension distribution across the width of a web or the effect of air loading (damping) has on measurements. Investigations relating to vibrations of air-coupled web systems have shown that air significantly changes the frequencies and mode shapes of the webs. See, for example, Raman et al., "Observations on the Vibrations of Paper Webs," Proceedings of 11th Annual Symposium on Information Storage and Processing Systems, Santa Clara, CA, June 10-13, p. 415-429 (2001), Vaughan et al., "Aeroelastic Stability of Axially Moving Webs Coupled to Incompressible Flows," Journal of Applied Mechanics, 77(2) (2010), and Feng et al., "Vibrations of Air-Coupled Web Systems," Journal of Vibration and Acoustics, 143(1):011004 (2021).

Linna et al., "Better Productivity by Measuring Web Tension Profile," In 55th Appita Annual Conference, Hobart, Australia 30 Apr.-2 May 2001: Proceedings, p. 305 (2001), reports the development of a system to measure the non-uniform web tension using air film pressure. However, the system only works for high web speeds in air R2R processes and needs recalibration when the web path changes. In addition, the technique operates with the assumption the cross-width web contact stiffness is uniform which does not occur in finite width systems even if the tension is uniform. Jin et al., "Web Tension Estimation by Local Contact Force Measurement in Roll-to-Roll Manufacturing," International Journal of Precision Engineering and Manufacturing, 21(11), p. 2067-2075 (2020), reported experimentally fitted web tension and contact force for a web under a fixed web deflection. However, this approach was specific to particular web properties, web geometry, and roller configuration and needed recalibration for each specific web measured.

In view of the above, a major and yet unmet challenge exists for achieving comprehensive, accurate, reliable, and inexpensive methods for measuring tension distribution in R2R processes with the goal of promoting the quality and yield of printed devices fabricated by roll-to-roll (R2R) processes.

BRIEF SUMMARY OF THE INVENTION

The present invention provides systems and methods for measuring web tension distribution in R2R processes, for example, such as R2R processes employed in the fabrication of printed devices, including but not limited to electronic, optical, and optoelectronic devices.

According to a nonlimiting aspect of the invention, a system is provided for monitoring tension distribution across a width of a web in a roll-to-roll system. The roll-to-roll system includes the web, at least first and second rollers between which the web travels in a longitudinal direction of the web, tension inducing means for inducing tension in the web in the longitudinal direction thereof, and fabricating means for fabricating printed devices on a surface of a flexible substrate of the web. The system includes means for inducing deflection in the web between the first and second rollers. The system is operable to determine an average tension and linear variation of tension present in the flexible substrate resulting from a nonuniform tension distribution induced in the flexible substrate between the first and second rollers.

According to a nonlimiting aspect of the invention, a method is provided for monitoring tension distribution across a width of a web in a roll-to-roll process. The method includes causing the web to travel between first and second rollers in a longitudinal direction of the web, inducing tension in the web in the longitudinal direction thereof such that tension is present in a flexible substrate of the web between the first and second rollers, and operating the system to determine an average tension and linear variation of tension present in the flexible substrate resulting from the tension induced in the web inducing a nonuniform tension distribution in the flexible substrate between the first and second rollers, the system comprising means for inducing deflection in the web between the first and second rollers.

Technical aspects of the systems and methods as described above preferably include the ability to monitor and measure the distribution of tension in a web and correct for a nonuniform tension distribution in R2R processes during the fabrication of devices whose quality and yield are affected by nonuniform tension.

Other aspects and advantages of this invention will be appreciated from the following detailed description.

BRIEF DESCRIPTION OF THE SEVERAL VIEWS OF THE DRAWING

FIG. 10A contains frequency response functions for the web when stationary, FIG. 10B contains frequency response functions for the web when moving at a transport speed of between 0.98 and 1.26 m min', and FIG. 10A contains frequency response functions for the web when moving at a transport speed of between 1.93 and 2.24 m $min^{-1}$.

FIG. 11 contains Table 1, which contains web properties and environment conditions used in simulation, experimental validations, and in-line measurements performed.

FIG. 12 contains Table 2, which contains results of in-line measurements of web tension distributions in two spans of a commercial R2R system under the environment conditions in Table 1 of FIG. 11.

DETAILED DESCRIPTION OF THE INVENTION

Figure 1:
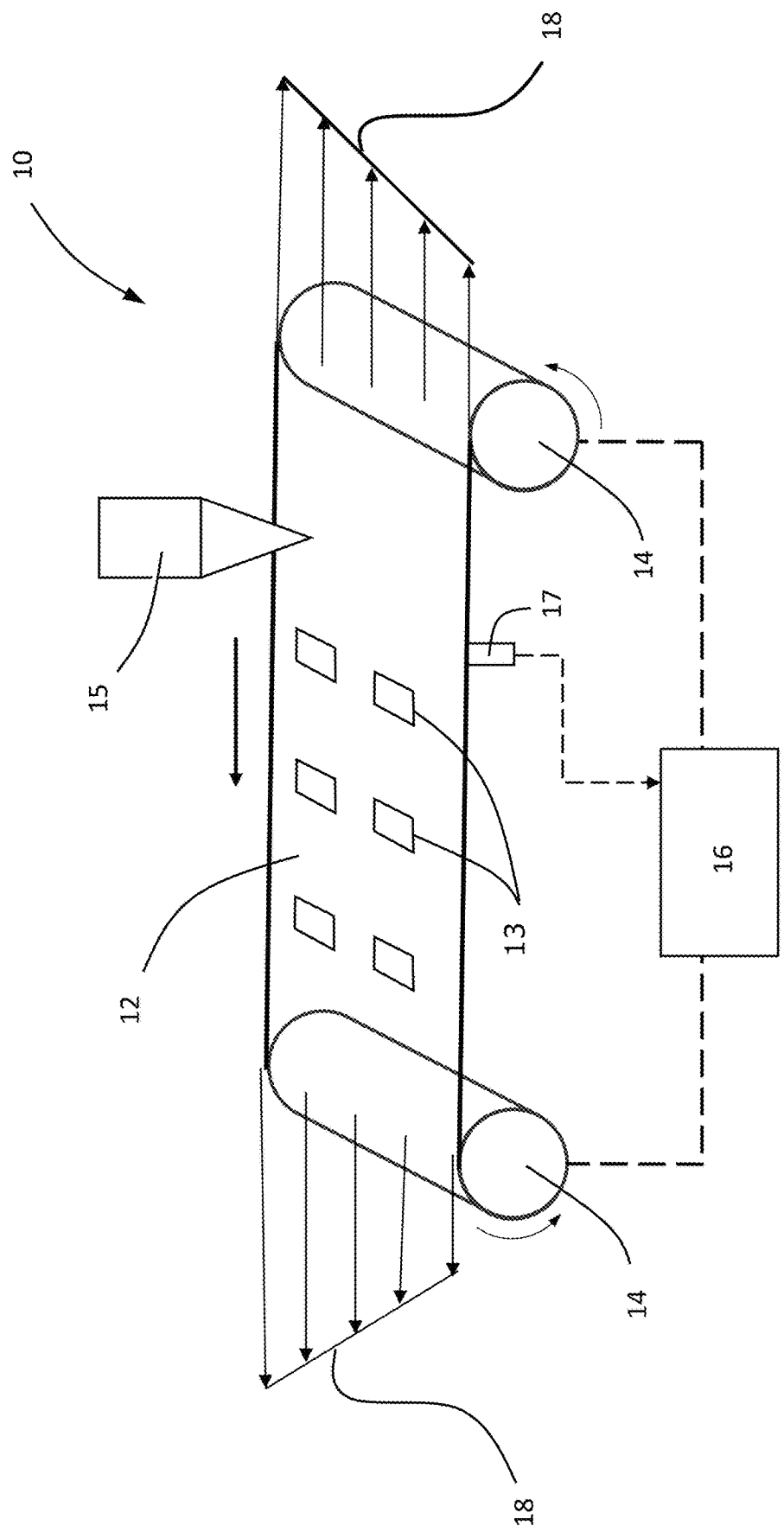
FIG. 1 schematically demonstrates the manner in which friction and misalignment of a web in a roll-to-roll (R2R) process can cause a nonuniform tension distribution within the web.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also describes certain investigations relating to the embodiment(s) depicted in the drawings, and identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

The following disclosure describes various aspects of systems, devices, and methods suitable for monitoring roll-to-roll (R2R) processes. The disclosure particularly describes various aspects of R2R systems used to fabricate printed devices, and methods and systems for monitoring and measuring the tension distribution in a web and correcting for a nonuniform tension distribution during the fabrication of printed devices whose quality and yield are affected by nonuniform web tension. Though the following discussion will particularly describe investigations for fabricating printed devices using R2R processes, the disclosure also encompasses other types of devices fabricated using other processes. As used herein, the term "fabricate" and its various forms encompass, but are not limited to, printing, depositing, coating, patterning, and modifying devices (and materials thereof) on a surface. The term "printed device(s)" is used herein to mean a wide variety of electronic, optical, and optoelectronic devices, including but not limited to thin film transistors, supercapacitors, organic light emitting diodes, solar cells, antennas, and sensors whose fabrication involves the deposition or processing of at least one layer of the device using one or more printing, coating, laser processing, annealing, or other thin-film or thick-film deposition, processing, and/or etching techniques, particular examples of which include ink jetting, gravure, screen, slot-die, chemical vapor deposition, laser/heat annealing, UV curing, and/or hot embossing. Furthermore, the terms "R2R" and "roller-to-roller" will be used to refer to systems and continuous processes capable of producing printed devices at mass volumes and, due to the fabrication method(s) used, may result in some of the printed devices being unreliable. This disclosure is further intended to account for shortcomings inherent in R2R and other relatively high-speed processes so as to increase device yield.

High-quality R2R manufacturing for flexible and printed devices often requires uniform tension in the web that comprises a flexible substrate on which the printed devices are fabricated. Non-uniformity in tension distribution can lead to nonuniform performance of printed devices across the width of the web, and excessive non-uniformity in web tension distribution can lead to web wrinkling. Nonlimiting examples of sources capable of inducing nonuniform tension distribution in a web include misalignment between rollers of the R2R system, non-uniform contact and/or friction between the web and rollers, nonuniform roller geometry, and nonuniform process parameters. The following description describes a "non-contact resonance" (NCR) method and a "gentle contact stiffness mapping" (GCSM) method developed and tested for measuring the web tension distribution in a web, characterized by at least the average tension and its linear variation across the width of a web. As used herein, "width," "cross-span," "average tension," and "linear variation of tension" (or in some cases "average stress" and "linear variation of stress") are in reference to a lateral direction that is transverse to the longitudinal direction in which the web travels between an adjacent pair of rollers of the R2R system. A portion of a web between an adjacent pair of rollers at any given moment is referred to herein as the "span" of the web. The NCR method uses resonance frequencies of a web with a closed-form expression to obtain its linearly varied tension distribution. The closed-form expression includes the significant effects of air loading on web vibrations through accurate hydrodynamic functions. The GCSM method is based on nonlinear regression of contact stiffness at multiple locations of the web.

Each of the disclosed NCR and GCSM methods can be employed to supplement an in-line metrology process of an existing R2R system that operates in air (such that the web is contacted by air or another gas or other fluid) or in a vacuum (in vacuo), without the need for expensive instrumented rollers (which is used herein to refer to rollers onto or into which tension sensors and/or pressure sensors are physically incorporated). Both methods are adapted to be capable of accurately measuring web tension distribution for a wide range of web properties, web paths, web tensions, measurement configurations, and environmental conditions. Both methods are also based on first principles mechanics models of a tensioned plate. The NCR method includes the plate's interactions with a surrounding fluid. The methods were cross-validated using static tests performed on a stationary test stand (in which a web was statically supported between two rollers) and the NCR method was validated using an in-line (dynamic) test performed with a commercial R2R system (in which a web was transported with rollers at speeds within a range typical for commercial R2R systems). In the investigations, up to 35.58% cross-span tension variation was measured in a web of a R2R system, and both average tension and its linear variation were shown to vary in different spans of a web of a R2R system. Reducing the cross-span tension variation can improve quality control of R2R processes for flexible and printed devices and increase device yields.

FIG. 1 schematically represents a roll-to-roll (R2R) system 10 comprising a web 12 traveling between an adjacent pair of rollers 14, and a printing device 15 for fabricating printed devices 13 across the width of the web 12 within a span of the web 12 between the rollers 14. This span may be referred to as a tension zone of the system 10, which may contain any number of tension zones depending on the processes performed on the web 12. The printing device 15 may be, as nonlimiting examples, an ink jet, gravure, screen, or slot-die printer. The web 12 may be subjected to other processes, as nonlimiting examples, chemical vapor deposition (CVD), laser/heat annealing, ultraviolet (UV) curing, and/or hot embossing. In the schematic representation of FIG. 1, the roller 14 downstream of the printing device 15 is a rewinder roller that is driven to induce tension in the web 12. Tension may be controlled in the web 12 using a closed-loop control system 16 that may speed up or slow down one or more of the rollers 14 and/or cause a tensile force to be directly applied to the web 12 using a mechanism such as a dancer (not shown). One or more feedback devices 17, such as a load cell, may be used to provide feedback to the control system 16 and thereby close the control loop. FIG. 1 schematically demonstrates the manner in which friction and misalignment of the web 12 in a R2R system 10 can cause a nonuniform (i.e., not constant) tension distribution 18 across the width of the web 12 within the span of the web 12 between the rollers 14. A nonuniform tension distribution in the web 12 (such as but not limited to that represented in FIG. 1) can lead to nonuniform performance of the devices 13 across the width of the web 12, or worse, lead to wrinkling of the web 12. As such, monitoring web tension and correcting for any nonuniform tension distribution are important considerations to understand the residual stresses, which can help in feedback quality control of R2R processes to maximize device yields.

Figure 2:
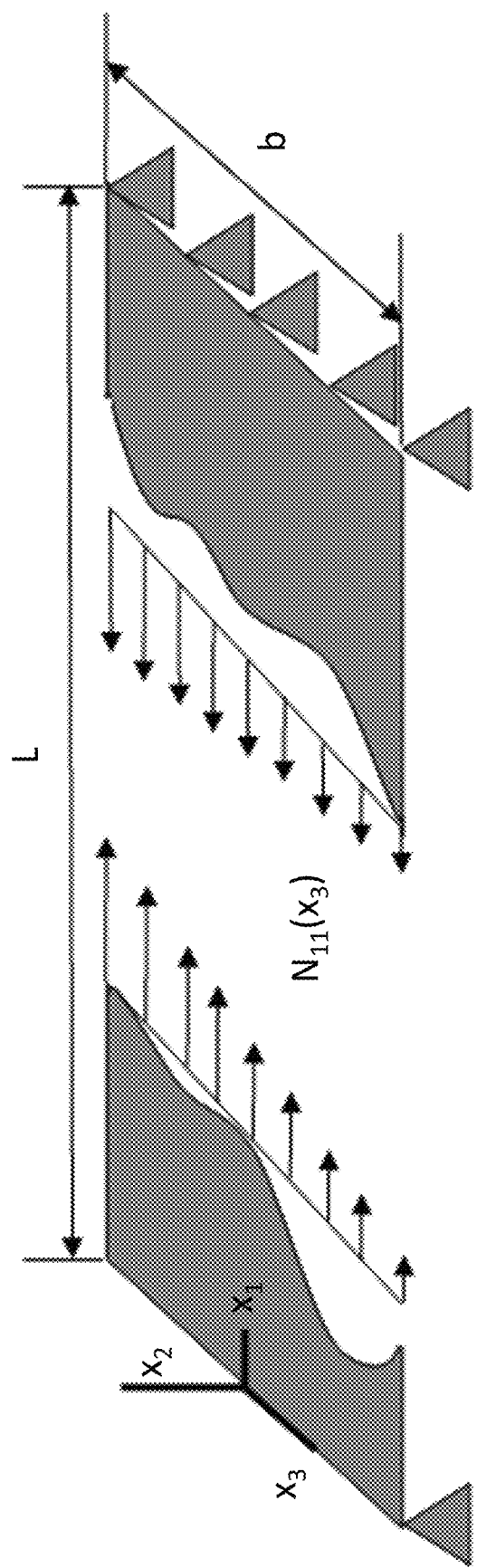
FIG. 2 is a diagrammatic representation of a web under a nonuniform tension distribution with reference to span geometry and a coordinate system.

FIG. 2 is a diagrammatic representation of a web having a nonuniform tension distribution with reference to span geometry and a coordinate system. A two-dimensional (2D) isotropic, linearly elastic, uniaxially tensioned, rectangular Kirchhoff plate model was chosen to simulate a single span between an adjacent pair of rollers of a R2R system (such as schematically represented in FIG. 1). To measure the tension distribution in a web, particularly the average tension and linear variation of tension in the web, the NCR method is capable of distinguishing resonance frequencies of the web, including but not limited to the lowest resonance frequencies of the web in the cross-span (width) direction of the web, whereas the GCSM method is capable of accurately determining the contact stiffness profile of a web in the cross-span (width) direction of the web. Because the R2R system does not apply tension in the cross-span direction, the NCR and GCSM methods use a tensioned Kirchhoff plate model instead of a linear membrane model to define the spatial dependence of eigenmodes in that direction, which includes a very small but finite web bending stiffness. In addition, the effect of the web transport speed (also referred to as line speed) to frequencies is very small in the operation range of typical R2R systems used in the fabrication of flexible printed devices manufacturing. The partial differential equation of motion for out-of-plane vibrations of a stationary tensioned plate is:

$$\rho_{web} \ddot{w}(x_1,x_3,\tau) + D\nabla^4 w(x_1,x_3,\tau) - N_{11}(x_3) w_{0.11}(x_1,x_3,\tau) = P(x_1,x_3,\tau). \quad (1)$$

As represented in FIG. 2, $x_1$, $x_2$, and $x_3$ are the coordinates along, respectively the longitudinal direction (in the plane of the web and along the direction of web travel and web tension), the transverse direction (normal to the surface of the web on which printed devices are fabricated), and the lateral direction (in the plane of the web but normal to the direction of web travel and web tension) of the web. L is the in-span length of the web in the longitudinal direction, b is the cross-span width of the web in the lateral direction, $\tau$ is time, $w(x_1, x_3, \tau)$ is the web deflection in the transverse direction, $\rho_{web}$ is the web areal mass density, $D=Eh^3/[12(1-\upsilon^2)]$ is the web bending stiffness with E, h, and $\upsilon$ denoting, respectively, Young's modulus, thickness, and Poisson's ratio of the web, $\nabla^4$ is the biharmonic operator, $N^{11}(x_3)$ is the web's uniaxial tension per unit width, $P(x_1, x_3, \tau)$ is the web surface pressure (such as air pressure in air-coupled web vibrations and pressure by contact force). The nonuniform tension distribution can be described as a polynomial function of $x_3$. The first two terms of the polynomial are determined from experiments as $$N_{11}(x_3) = N_{11}^{ave}\left(1 + \sigma\frac{2x_3}{b}\right), \quad (2)$$

where $N_{11}^{ave}$ is the average web tension per unit width (N/m), and $\sigma$ is a dimensionless ratio for the linear variation of tension describing the discrepancy between maximum or minimum tension to $N_{11}^{ave}$. Especially, $N_{11}(\pm b/2)=2N_{11}^{ave}$ or 0 when $|\sigma|=1$, which indicates there is no tension applied on one of the free edge. So that, $|\sigma|=1$ is a critical tension variation for local web wrinkling close to one of the free edges. Substituting Equation (2) into Equation (1)

$$\rho_{web}\ddot{w}(x_1, x_3, \tau) + D\nabla^4 w(x_1, x_3, \tau) - \qquad (3)$$
$$N_{11}^{ave}\left(1 + \sigma\frac{2x_3}{b}\right) w_{11}(x_1, x_3, \tau) = P(x_1, x_3, \tau).$$

Simply supported boundary conditions can accurately predict linear vibrations of pre-tensioned webs across finite radius rollers, so the following boundary conditions are used for both NCR and GCSM analyses:

1) the web is simply supported on the upstream and downstream rollers $$w(0,x_3,\tau)=w(L,x_3,\tau)=0, w_{0.11}(0,x_3,\tau)=w_{0.11}(L,x_3,\tau)=0; \quad (4)$$

2) there is no shear force or bending moment for the free edges $$w_{0.33}(x_1,\pm b/2,\tau)+\upsilon w_{0.11}(x_1,\pm b/2,\tau)=0,$$

$$w_{0.333}(x_1,\pm b/2,\tau)+(2-\upsilon)w_{0.311}(x_1,\pm b/2,\tau)=0. \quad (5)$$

NCR Method

Figure 3:
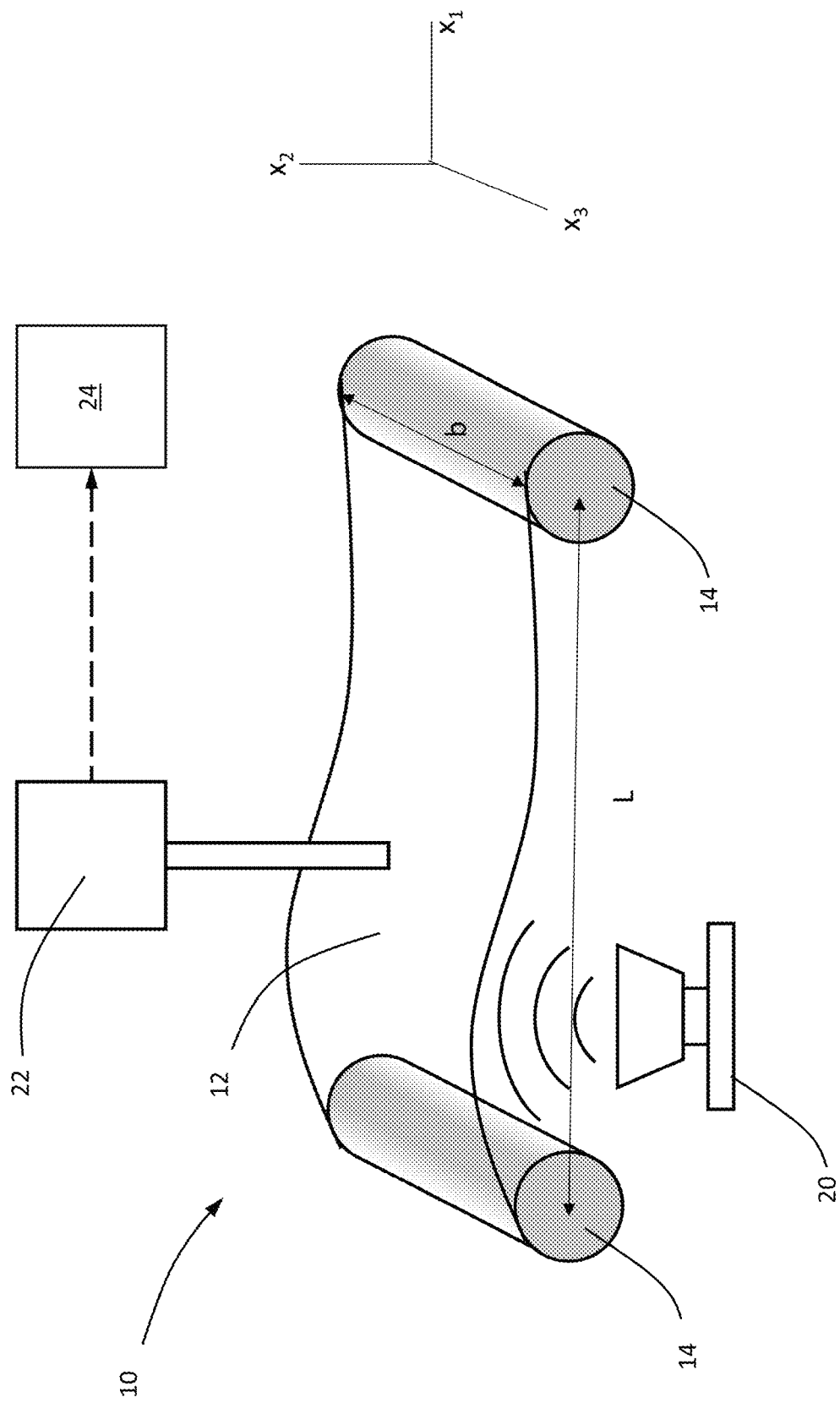
FIG. 3 schematically represents a system for measuring (monitoring) web tension distribution in accordance with a nonlimiting embodiment of this invention.

FIG. 3 schematically represents a monitoring system adapted to measure (monitor) the tension distribution (including the existence of a nonuniform tension distribution) in a web in a R2R process in accordance with the NCR method as described below. In FIG. 3, the monitoring system is schematically represented as installed with a R2R system 10, and is schematically represented as comprising at least one device 20 for inducing deflection, in particular, exciting vibration, in the web 12, a device 22 for detecting vibration (deflection) of the web 12 (as a nonlimiting example, a laser sensor or other non-contact motion or proximity sensor), and a processor 24. The device 20 is schematically represented in FIG. 3 as an acoustic speaker, though other means for inducing vibration are foreseeable (especially if the web 12 and device 20 are in a vacuum), as nonlimiting examples, intrinsic vibrations mechanically, thermally, and/or acoustically present in or surrounding the system 10. The processor 24 performs calculations based on the sensed vibration, including but not limited to calculating the average tension (and/or stress) and the linear variation of tension (and/or stress) based on resonance frequencies of vibration using a tensioned Kirchhoff plate model to define spatial dependence of eigenmodes across the width of the web. As schematically represented in FIG. 3, the system for measuring web tension distribution encompasses the devices 20 and 22 and processor 24, the latter of which may be part of the control system 16 represented as part of the R2R system 10 in FIG. 1. As such, in combination with the control system 16 and feedback device(s) 17 depicted in FIG. 1, the system for measuring web tension distribution represented in FIG. 3 may also encompass or constitute a subsystem of means for controlling the tension induced in the web to increase uniformity of the tension distribution present in the web 12. Other aspects of the system 10 represented in FIG. 3 and not discussed in any detail hereinafter may be, in terms of components, function, etc., essentially as was described for the system 10 of FIG. 1.

In the nonlimiting investigations reported herein, the NCR method measured $N_{11}^{ave}$ and $\sigma$ using the lowest transverse resonance frequencies, $f_{11}$ and $f_{12}$, of a web, whose eigenmodes 11 and 12 are generally (though not necessarily purely) symmetric and antisymmetric, respectively. The eigenmodes of $f_{11}$ and $f_{12}$ are coupled by the nonuniform tension distribution. To describe the method in a consistent way for both in air and in vacuo R2R processes, the key results were derived in the presence of air effect to estimate the effect of aerodynamic loading on the resonance frequencies and eigenmodes of the vibrating web. The air effect was modeled as an inviscid, incompressible fluid that surrounds the vibrating web. Web tension was assumed to vary linearly. The two lowest web frequencies were predicted as $$f_{11} = \sqrt{\frac{N_{11}^{ave}}{8L^2}\left[\left(\frac{1}{\overline{M}_{11}} + \frac{1}{\overline{M}_{12}}\right) - \sqrt{\left(\frac{1}{\overline{M}_{11}} - \frac{1}{\overline{M}_{12}}\right)^2 + \frac{4\sigma^2}{3\overline{M}_{11}\overline{M}_{12}}}\right]} \text{ (Hz)}, \tag{6}$$

$$f_{12} = \sqrt{\frac{N_{11}^{ave}}{8L^2}\left[\left(\frac{1}{\overline{M}_{11}} + \frac{1}{\overline{M}_{12}}\right) + \sqrt{\left(\frac{1}{\overline{M}_{11}} - \frac{1}{\overline{M}_{12}}\right)^2 + \frac{4\sigma^2}{3\overline{M}_{11}\overline{M}_{12}}}\right]} \text{ (Hz)}. \tag{7}$$

where the values of $\overline{M}_{11}$ and $\overline{M}_{12}$ are described as functions of hydrodynamic functions, web dimensions L and b, the web areal mass density $\rho_{web}$, and the air density $\rho_{air}$. For the in vacuo analysis, air density was taken as 0, so that $\overline{M}_{11}$ and $\overline{M}_{12}=\rho_{web}$ and $$f_{11} = \sqrt{\frac{N_{11}^{ave}}{4\rho_{web}L^2}\left(1 - \frac{\sigma}{\sqrt{3}}\right)} \text{ (Hz)}, \tag{8}$$

$$f_{12} = \sqrt{\frac{N_{11}^{ave}}{4\rho_{web}L^2}\left(1 + \frac{\sigma}{\sqrt{3}}\right)} \text{ (Hz)}. \tag{9}$$

Figure 4:
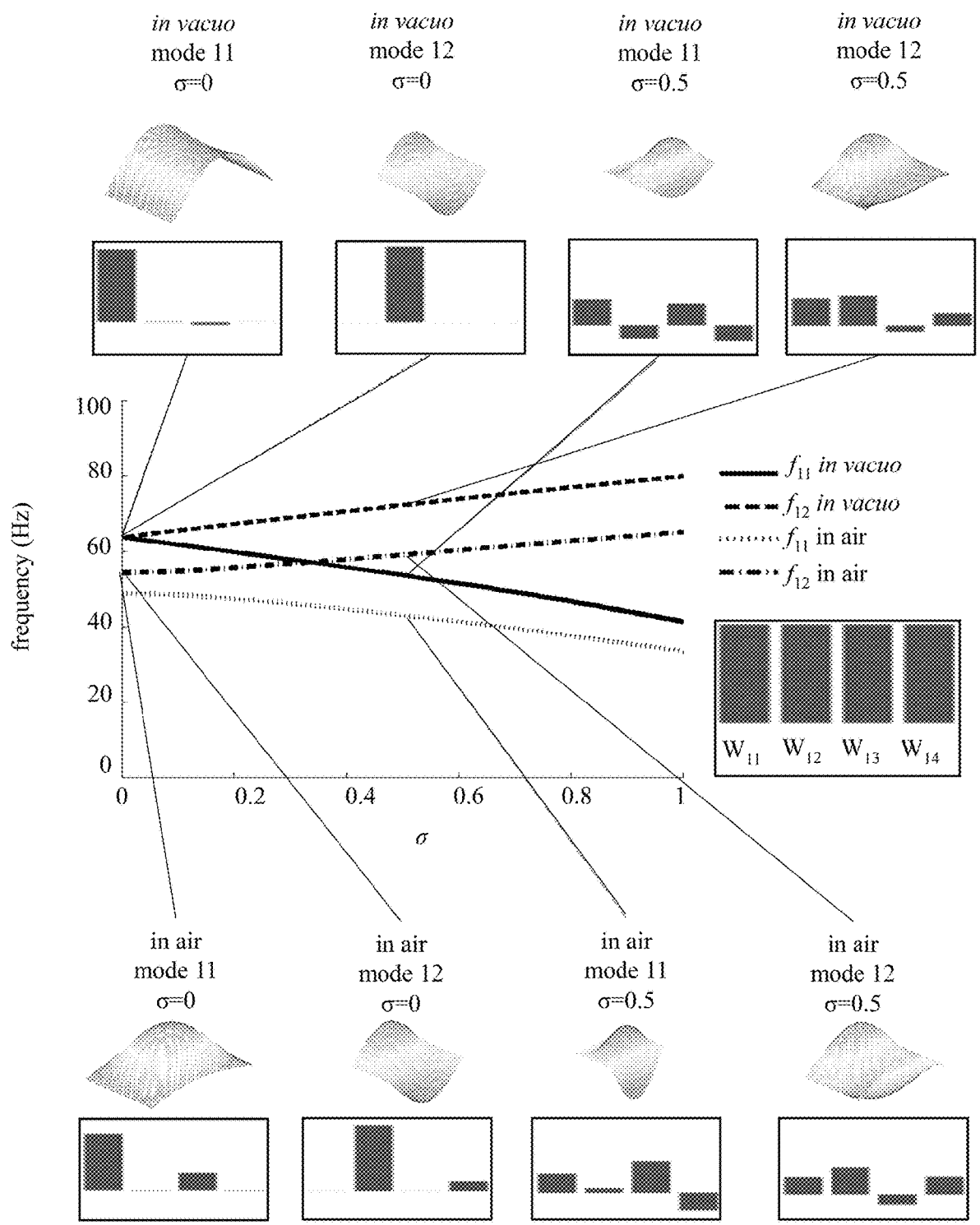
FIG. 4 is a diagram identifying two resonance frequencies, $f_{11}$ and $f_{12}$, as a function of linear variation of stress (indicated in FIG. 4 by a dimensionless ratio ($\sigma$) for the linear variation of tension describing the discrepancy between maximum or minimum tension to an average tension per unit width ($N_{11}^{ave}$)) for R2R webs operating in atmospheric air (wherein the web is contacted by air or another gas or other fluid, sometimes referred to herein simply as "in air" as a matter of convenience) and in a vacuum (in vacuo), and depicts corresponding mode shapes when $\sigma$=0 and 0.5. The grey bars show the contribution of each basis function in the mode shapes. Analytical formulas were developed based on tensioned plate theory that relate resonance frequencies (as examples, $f_{11}$ and $f_{12}$) to the average tension and the linear variation of tension for R2R processes performed in vacuo and in air. The representative web is formed of PET with properties and environment conditions identified in Table 1 of FIG. 11. The average web tension in this example is 150.47 $Nm^{-1}$.

As evidenced in FIG. 4, in R2R systems operating in air and in vacuo, the dimensionless ratio (a) for the linear variation of tension (hereinafter simply referred to as the linear variation of tension) significantly changes the frequencies and their corresponding mode shapes compared to a uniform tension distribution case. In the example represented in FIG. 4, the web is a flexible substrate entirely formed of PET with the properties and air density as shown in Table 1 of FIG. 11. The average tension per unit width, $N_{11}^{ave}$ (hereinafter simply referred to as the average tension) in this example is 150.47 N/m. The frequencies were calculated by Equations (6)-(9). The corresponding mode shapes with σ=0 were obtained using an Assumed Modes Method (AMM). For the in vacuo R2R systems, $M_{air}^{\rho(4\times4)}$. The small boxes with grey bars show the contributions of basis functions $W_{11}$, $W_{12}$, $W_{13}$, and $W_{14}$, to their corresponding mode shapes. The basis functions were:

$$W_{11}' = \sqrt{2\kappa}\sin(\pi x_1'),$$

$$W_{12}' = \sqrt{24\kappa}\sin(\pi x_1')\kappa x_3',$$

$$W_{13}' = 6\sqrt{10\kappa}\sin(\pi x_1')\left(-\kappa^2 x_3'^2 + \frac{1}{12}\right),$$

$$W_{14}' = 20\sqrt{14\kappa}\sin(\pi x_1')\left(-\kappa^3 x_3'^3 + \frac{3\kappa x_3'}{20}\right).$$

The following observations were made:
In both in vacuo and in air cases, increasing linear variation of tension reduces the resonance frequency ($f_{11}$) and increases the resonance frequency ($f_{12}$);
The lowest resonance frequencies ($f_{11}$ and $f_{12}$) of a web are tightly clustered for the in vacuo web system under a uniform tension distribution (i.e., a linear variation of tension equal to 0) but split apart by a nonuniform tension distribution;
The lowest resonance frequencies ($f_{11}$ and $f_{12}$) of a web having a uniform tension distribution in air are separated since they have different magnitudes of added air masses;
From the grey bars with a uniform tension distribution (i.e., a linear variation of tension equal to 0), the eigenmodes 11 and 12 are purely symmetric and antisymmetric, respectively. There is no cross coupling between symmetric and antisymmetric basis functions in a web having a uniform tension distribution; and
Nonuniform tension distribution (i.e., a linear variation of tension other than to 0) causes coupling between symmetric and antisymmetric basis functions in the mode shapes and changes mode shapes for both in vacuo and in air cases.

To measure the average tension and the linear variation of tension by the lowest resonance frequencies $f_{11}$ and $f_{12}$, Equations (6) and (7) were rewritten inversely obtain a closed-form expression as $$N_{11}^{ave} = \frac{4L^2\overline{M}_{11}\overline{M}_{12}(f_{11}^2 + f_{12}^2)}{\overline{M}_{11} + \overline{M}_{12}}, \tag{10}$$

$$\sigma = \pm\sqrt{3 - \frac{3(\overline{M}_{11} + \overline{M}_{12})^2 f_{11}^2 f_{12}^2}{\overline{M}_{11}\overline{M}_{12}(f_{11}^2 + f_{12}^2)^2}}. \tag{11}$$

Note that the NCR method can solve the linear variation of tension but not its direction, since both positive and negative value of the linear variation of tension (σ) gives the same frequencies as shown in Equations (6)-(9). There is no air loading in an in vacuo R2R system, and Equations (10) and (11) can be simplified as $$N_{11}^{ave} = 2L^2\rho_{web}(f_{11}^2 + f_{12}^2), \tag{12}$$

$$\sigma = \pm\sqrt{3 - \frac{12 f_{11}^2 f_{12}^2}{(f_{11}^2 + f_{12}^2)^2}}. \tag{13}$$

Equations (10)-(13) are applicable for a wide range of web properties, web thickness, web aspect ratio, web path, web tension, measurement configurations, and environmental conditions without the need for recalibration.

GCSM Method

Figure 5:
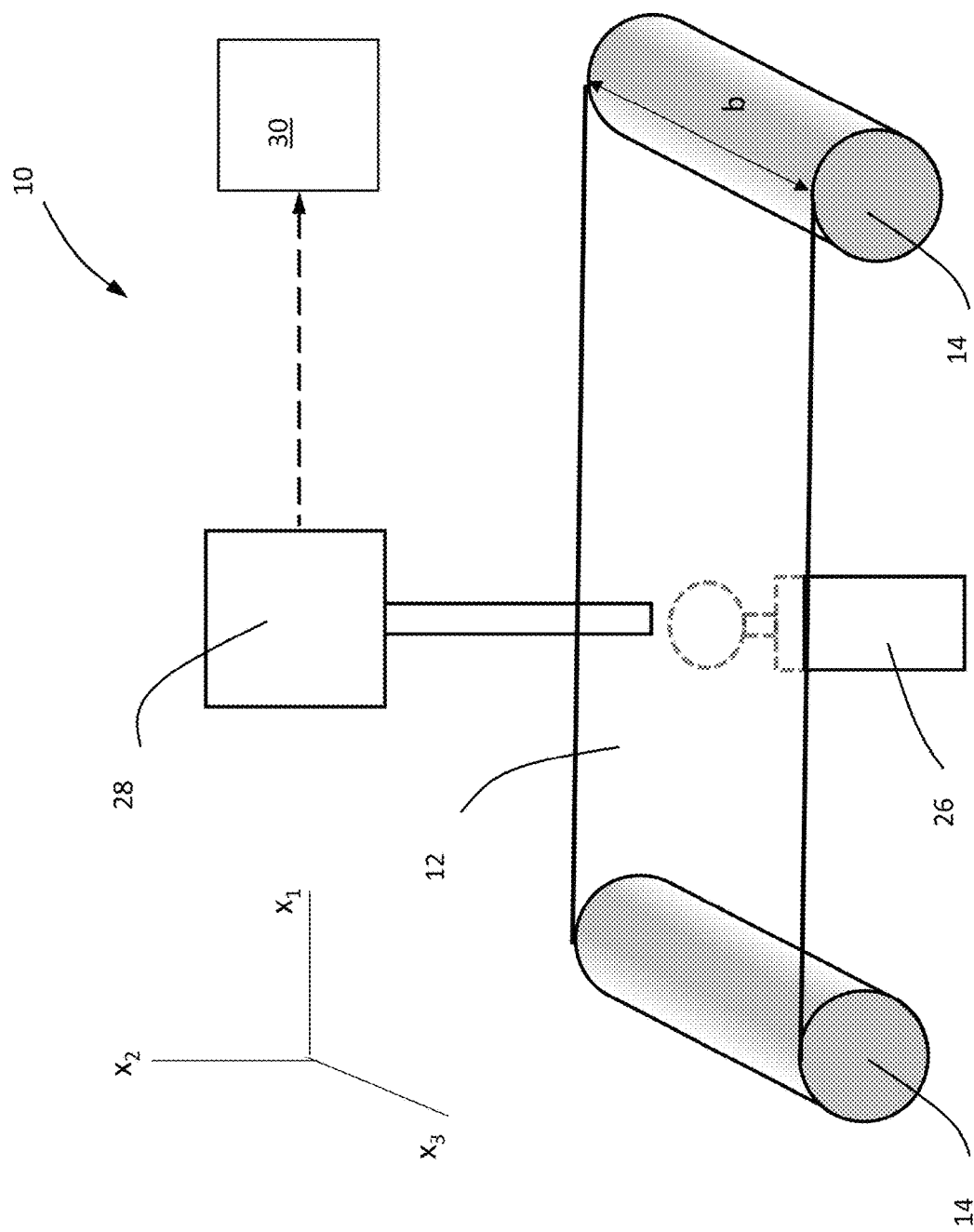
FIG. 5 schematically represents a system for measuring (monitoring) web tension distribution in accordance with another nonlimiting embodiment of this invention.

FIG. 5 schematically represents a monitoring system adapted to measure (monitor) the tension distribution (including the existence of a nonuniform tension distribution) in a web of a R2R process in accordance with the GCSM method as described below. In FIG. 5, the monitoring system is schematically represented as installed with a R2R system 10, and is schematically represented as comprising at least one device 26 for inducing deflection in the web 12 (as a nonlimiting example, one or more devices 26 that apply in sequence at least two predetermined and constant forces at different levels and different locations across the width (cross-span) of the web 12), a device 28 for detecting deflection of the web 12 (as a nonlimiting example, a laser sensor or other non-contact motion or proximity sensor), and a processor 30. The device 26 is schematically represented in FIG. 5 as a force gauge, though other means for inducing predetermined and constant deflections in the web 12 are foreseeable. The processor 30 performs calculations based on the sensed deflection, including but not limited to using a tensioned Kirchhoff plate model to calculate the average tension (and/or stress) and the linear variation of tension (and/or stress) based on deflection at locations across the width of the web 12. As schematically represented in FIG. 5, the system for measuring web tension distribution encompasses the devices 26 and 28 and processor 30, the latter of which may be part of the control system 16 represented as part of the R2R system 10 in FIG. 1. As such, in combination with the control system 16 and feedback device(s) 17 depicted in FIG. 1, the system for measuring web tension distribution represented in FIG. 5 may also encompass or constitute a subsystem of means for controlling the tension induced in the web to increase uniformity of the tension distribution present in the web 12. Other aspects of the system 10 represented in FIG. 5 and not discussed in any detail hereinafter may be, in terms of components, function, etc., essentially as was described for the system 10 of FIG. 1.

In the GCSM method, multiple contact forces are gently applied in at least two locations along the width of the web and the resulting deflections are measured. The forces are applied gently to make sure the web deforms far below its plastic deformation region. In each contact location, multiple local contact forces are fitted with their deflections with a polynomial with linear and cubic terms to extract the local (linear) contact stiffness. This nonlinear fitting reflects the nonlinear response derived from nonlinear Von Kármán theory plate mechanics. The web tension distribution (the average tension $N_{11}^{ave}$ and the linear variation of tension $\sigma$) is obtained by nonlinear regression of local contact stiffness in different locations. In addition, plastic deformation would locally damage the web and reduce the accuracy of measurement. To avoid local plastic deformation, the contact force was gently applied with a large contact sphere (a standard ping-pong ball) to make sure that all work done by each contact force was absorbed by the web strain energy in the elastic region.

To use the measured linear contact stiffness at two locations of the web to determine the web tension distribution, the web deflection determined by Equation (1) was assumed to be in the quasi static loading case is a linear combination of admissible basis functions as $$W(x_1, x_3) = \sum_{m=1}^{M}\sum_{n=1}^{N} \sin\frac{m\pi x_1}{L}\left[A_{mn}\sin\frac{(2n-1)\pi x_3}{b} + B_{mn}\cos\frac{(2n-2)\pi x_3}{b}\right], \quad (14)$$

where M and N are the number of functions along the $x_1$ and $x_2$ directions, respectively. $A_{mm}$ and $B_{mm}$ are the amplitude of antisymmetric and symmetric components, respectively. Equation (15) was obtained to describe the relation between $A_{mm}$, $B_{mm}$, the average tension $N_{11}^{ave}$, the linear variation of tension a, and the local contact force F as:

$$\begin{bmatrix} C_1 & C_2 \\ C_3 & C_4 \end{bmatrix}\begin{Bmatrix} A \\ B \end{Bmatrix} = \sin\frac{m\pi X_1}{L}\begin{Bmatrix} C_5 \\ C_6 \end{Bmatrix}, \quad (15)$$

$X_1$ is the coordinate of the contact location in the $x_1$ direction. Once the deflection of a web under the contact force is obtained, the local contact stiffness can be solved as $$k(X_1, X_3) = \frac{F}{W(X_1, X_3)} = \quad (16)$$

$$\frac{1}{\sum_{m=1}^{M}\sum_{n=1}^{N}\sin\frac{m\pi X_1}{L}\left[A'_{mn}\sin\frac{(2n-1)\pi X_3}{b} + B'_{mn}\cos\frac{(2n-2)\pi X_3}{b}\right]}.$$

where $X_3$ is the coordinate of the contact location in the $x_3$ direction, $A'_{mm}=A_{mm}/F$, and $B'_{mm}=B_{mm}/F$. Based on a convergence study on deflections of the center of the web and the center of a free edge, choosing M=51 and N=18 ensured a 1% discrepancy to M=1E4 and N=1E4. Alternatively, one could choose to use M=3 and N=5 with a 20% compensation in the calculations.

Figure 6:
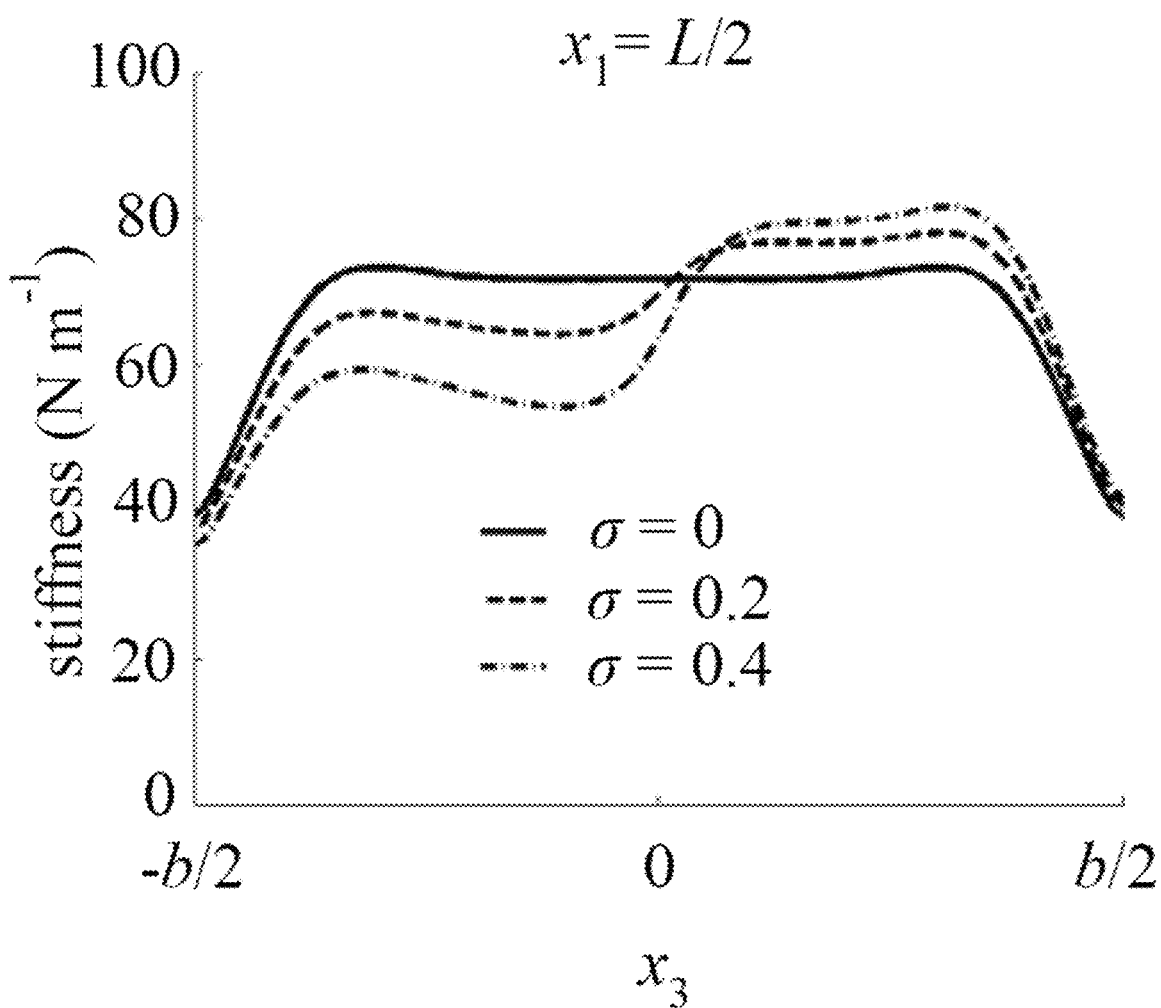
FIG. 6 plots the cross-span contact stiffness profiles of a web subjected to deflection when utilizing a measuring system of the type represented in FIG. 5.

Applying the same contact force at different locations gives different local deflections. To understand the deflection shape of the entire web with respect to the contact location, computations were performed that showed that, on a PET web the same web properties as used for FIG. 3 and the same contact force F=0.1N applied at four different locations along the $x_1$ direction, the deflection was larger at the center than at locations closer to the rollers, which agrees with the restriction of simply supported boundary conditions in Equation (4), while along the $x_3$ direction, the web deflected more with a contact force applied at a free edge than at the center, which means there is an edge effect of web stiffness. To understand the spatial variations of the web's contact stiffness, contact stiffness was solved by Equations (15) and (16), again based on the web properties being the same as for FIG. 3. FIG. 6 is a graph plotting the corresponding cross-span profiles of web contact stiffness at $x_1$=L/2. The following observations were made:

Along the longitudinal direction $x_1$, the contact stiffness close to the simply supported boundaries was higher than the center region, and contact stiffness is eventually infinity on these boundaries;

There were edge effects close to the free edges, and in the lateral direction $x_3$ the local contact stiffness close to the edges dropped to roughly half of that in the central region;

When the web was under a uniform tension distribution, its contact stiffness profile was symmetric to both $x_1$=L/2 and $x_3$=0; and Nonuniform tension distribution changed the contact stiffness profile to asymmetric to $x_3$=0.

Equation (17) is based on the strain-displacement relations in the Von Kámán theory and the anti symmetric contact force and web deflection relation on two sides of the web in the transverse direction, $x_2$.

$$F = k'_1\frac{W(X_1, X_3)}{h} + k'_3\left(\frac{W(X_1, X_3)}{h}\right)^3, \quad (17)$$

where $k'_1$ and $k'_3$ are the linear and cubic coefficient to the deflection to web thickness ratio. Web deflection is measured under multiple local contact forces on the same location of the web to obtain $k'_1$ and $k'_3$ with least squares fitting. The local linear contact stiffness in linear elastic deformation region yields $$k = \frac{k'_1}{h}. \quad (18)$$

After measuring the linear contact stiffnesses in at least two locations with different $X_3$ values, the average tension $N_{11}^{ave}$ and the linear variation of tension $\sigma$ can be solved for the web. Solving linear contact stiffness from known average tension and linear variation of tension is straight forward by using Equations (15) and (16), however a closed-form solution to solve average tension and linear variation of tension from the contact stiffness is not available. A nonlinear regression with the trust-region-reflective algorithm was used to solve for average tension and linear variation of tension. In the optimization procedure, the root mean square error between the measured stiffnesses and the model was minimized as $$e = \sqrt{\frac{1}{r}\sum_{i=1}^{r}(k(X_1, X_3^{(i)}) - k^{(model)}(X_1, X_3^{(i)}))^2}, \quad (19)$$

where r is the total number of locations being measured. The gradients of e to $N_{11}^{ave}$ and $\sigma$ in each iteration step is chosen to be those between ±10% of current estimated $N_{11}^{ave}$ and $\sigma$, respectively.

Experimental Procedure

Experimental tests were performed on the basis of the NCR and GCSM methods described above. As previously noted, each method was evaluated on a stationary test stand (a web statically supported between two rollers) to enable cross-validation of the two methods, and the NCR method was further evaluated using an in-line (dynamic) test performed with a web transported with rollers of a commercial R2R system at transport (line) speeds to demonstrate the performance of the NCR method in a manufacturing environment. For the experiments, the stationary test stand and the R2R system were configured with monitoring systems as schematically represented in FIGS. 3 and 5 for conducting the NCR and GCSM methods, respectively.

In tests performed with the NCR method on the stationary test stand and the R2R system, the monitoring system utilized (as the device 20 of FIG. 3) a speaker (VISATON® FR 10, VISATON GmbH & Co. KG) to excite vibration in the webs, and utilized (as the device 22 of FIG. 3) a laser sensor (Microtrak 7000, MTI Instruments Inc.) to measure the responses. A data acquisition system and processing means (corresponding to the processor 24 of FIG. 3) were used to record and process the resulting vibrational responses sensed with the laser sensor. The experiments are conducted on a PET web (film) matching properties and dimensions as used in the simulations discussed above. A section of the PET web was painted white to facilitate measurements with the laser sensor. Tension was applied by hanging either a 2.34 kg or 2.85 kg low-carbon steel rod at the end of the web. Careful roller and web alignment was performed to minimize nonuniformity of the tension distribution. A chirp signal that varied from 1 Hz to 100 Hz in 200 seconds with an amplitude 0.005 V was used to drive the speaker. The amplitude and phase of the response sensed with the laser sensor were computed with a Fast Fourier Transform. The transfer function of the web was found from the radio of amplitudes and the differences of phases of a measurement on the web and a measurement directly on the speaker. The resonance frequencies were obtained by a single degree-of-freedom (SDOF) fitting of the transfer function to its half-power bandwidth.

In the tests performed with the GCSM method on the stationary test stand, the monitoring system utilized (as the device 26 of FIG. 5) a force gauge (VTSYIQI HF-5 Digital Push Pull Force Gauge, Vetus Electronic Technology Co.) equipped with a ping-pong ball as a contact head to both deform the web and measure the resulting force, and utilized the same laser sensor (as the device 28 of FIG. 5), the same data acquisition system, and the same processing means (corresponding to the processor 30 of FIG. 5) as was used with the NCR method to measure, record, and process the web deformation at the loading locations. Use of the ping-pong ball contact head with its relatively large contact area minimized local plastic deformation of the web. Forces from 0.06 N to 0.13 N in increments of between 0.004 N and 0.01 N were applied to the web with corresponding web deformations varying between 0.55 mm to 1.10 mm.

For the in-line tests performed using the NCR method on the commercial R2R system, web tension distribution was measured in two spans of a DICEweb digital inkjet printer R2R system (Prototype & Production Systems, Inc.). The web tension was applied by the torque from an unwind roller servo motor of the R2R system, and web transport speed was adjusted by the torque from the rewind roller servo motor. Both rollers had sensors to measure the radii of rolls to control the applied torques. The DICEweb system did not have feedback control as tested for the tension and speed dynamics. For these measurements, an opaque PET web was used whose properties are shown in Table 1 of FIG. 11. In-span lengths of the R2R system were designated as span 1 and span 2 and measured 292.10 mm and 107.95 mm, respectively. Span 1 was upstream of span 2, and span 2 corresponded to the functional area of the inkjet printer. A laser sensor and speaker were installed on each of the two spans. The orientation of the laser sensor was orthogonal to the web moving direction.

Figure 7:
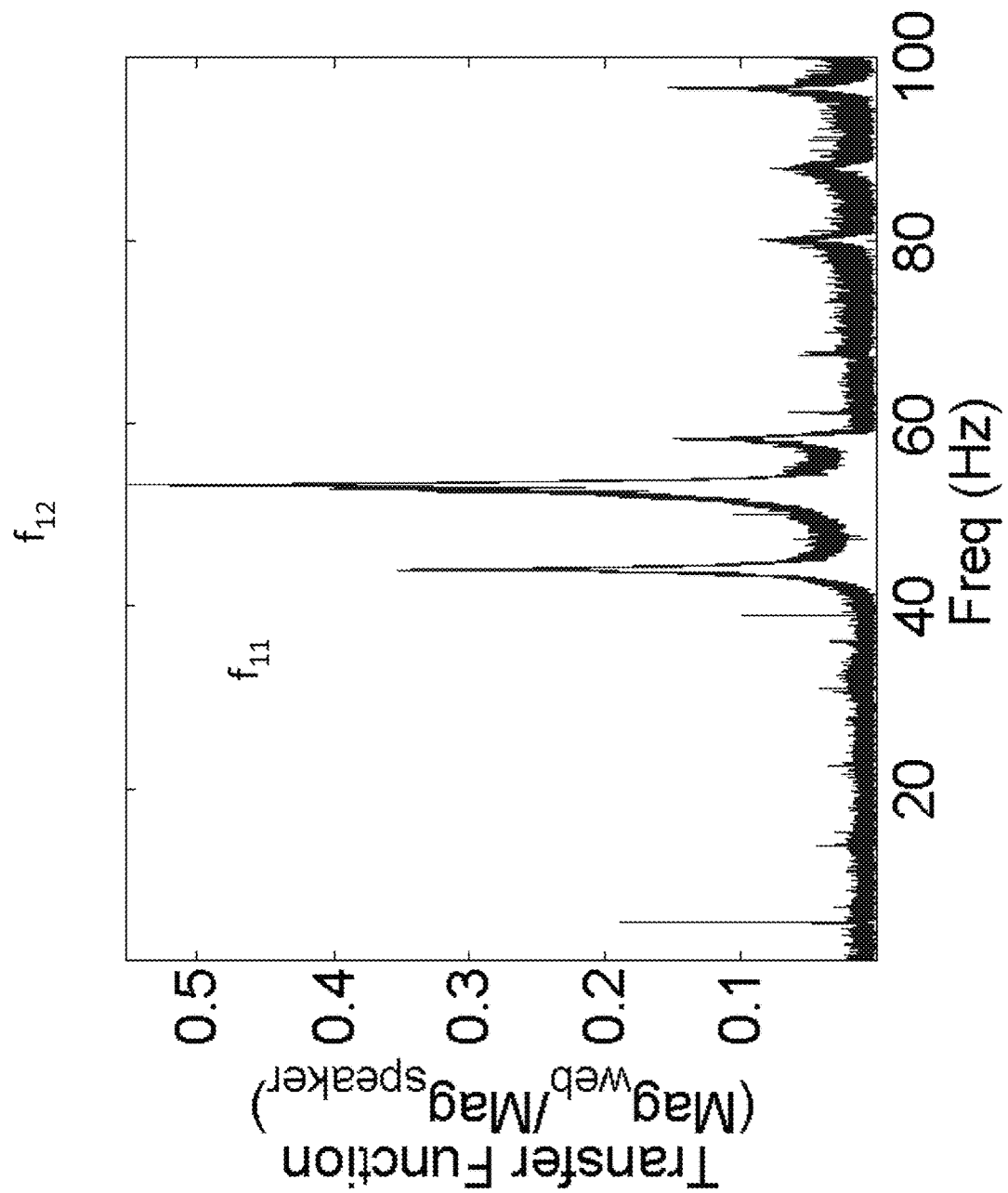
FIG. 7 is a graph plotting the frequency response function showing the local measured transfer functions, phases, and single degree-of-freedom (SDOF) fitted transfer functions of the lowest two resonance frequencies, $f_{11}$ and $f_{12}$, when utilizing a measuring system of the type represented in FIG. 3.
Figure 8:
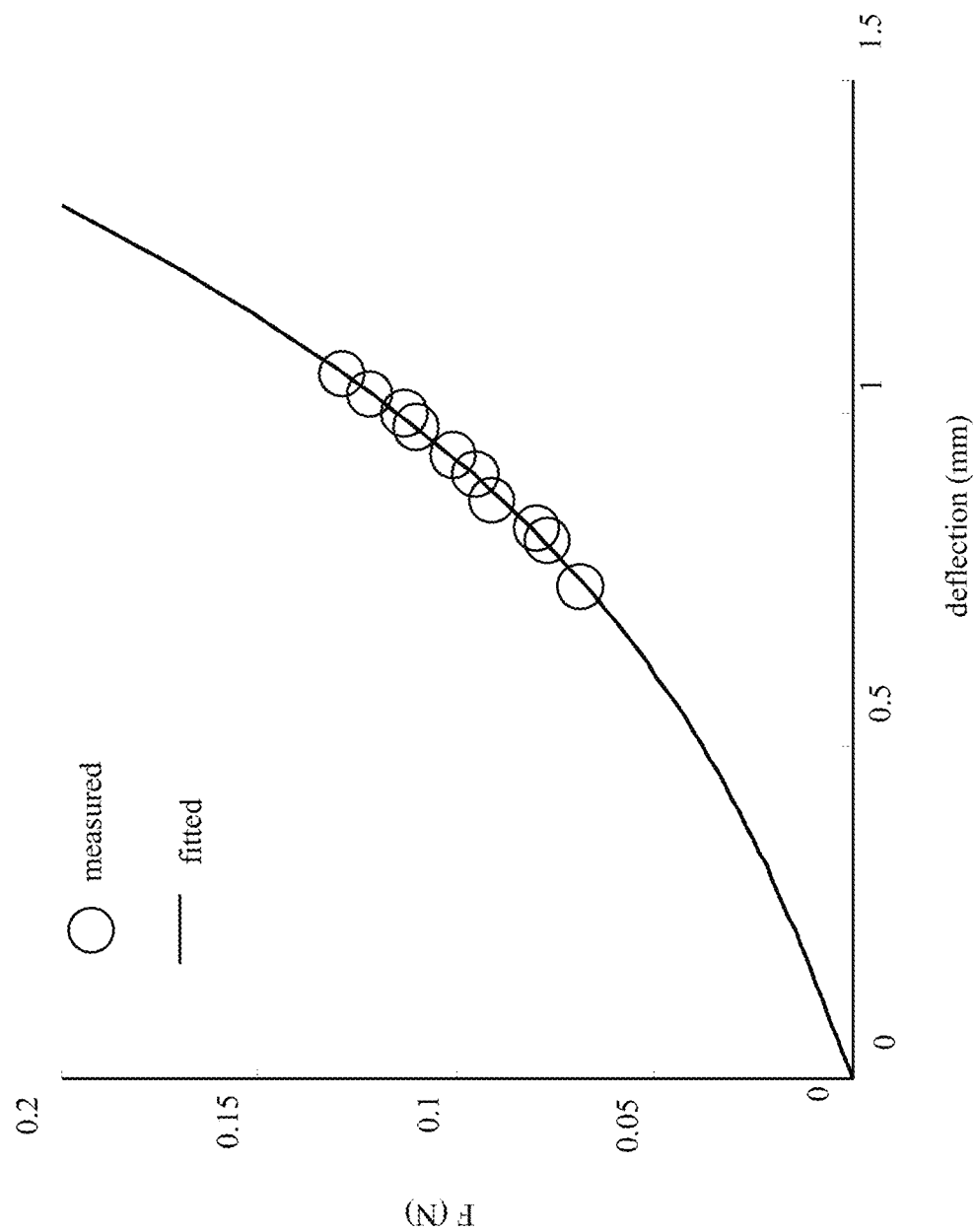
FIG. 8 is a graph plotting the fitting of multiple contact forces and deflections when utilizing a measuring system of the type represented in FIG. 5.
Figures 9A, 9B:
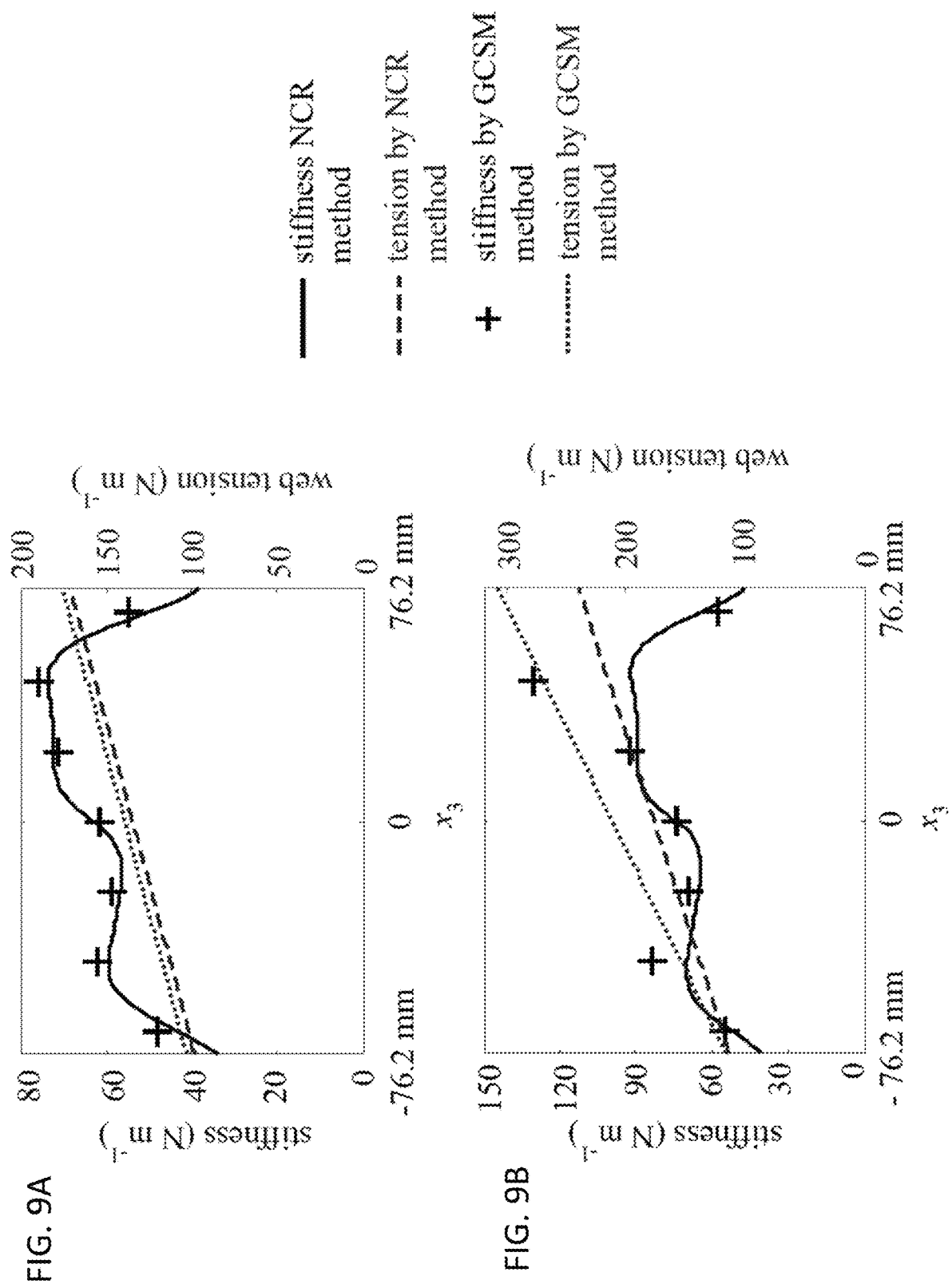
FIGS. 9A and 9B are graphs comparing the tension measuring methods of the measuring systems represented in FIGS. 3 and 5.

FIGS. 7, 8, 9A, and 9B are graphs containing data obtained from the NCR and GCSM cross-validation experiments. For the data plotted in FIG. 7 for the NCR method, the location of the speaker remained fixed whereas the laser sensor is repositioned to seven different locations ($X_1$=101.6 mm and $X_3$=0 mm, ±22.86 mm, ±45.72 mm, and ±68.58 mm). For the data plotted in FIG. 8 for the GCSM method, the contact head was positioned at the same seven locations as those used for the NCR method. The web was a PET web tensioned with either the 2.34 kg hanging mass (FIGS. 7, 8, and 9A) or the 2.85 kg hanging mass (FIG. 9B).

FIG. 7 plots the frequency response function at $X_1$=101.6 mm and $X_3$ at −45.72 mm. FIG. 8 plots the fitting of multiple contact forces and deflections at $X_1$=101.6 mm and $X_3$ at −45.72 mm using Equation (17). FIG. 7 shows the frequency response function between 1 Hz to 100 Hz including two resonance peaks. A 180° shift in phase was observed as the frequency moved across the resonance regions. The average value and one standard deviation of the first two resonance frequencies were $f_{11}$=43.89±0.02 Hz and $f_{12}$=53.22±0.06 Hz. FIG. 8 shows the results of fitting the contact force and deflection with the Von Karman theory for the GCSM method. Local contact stiffness in the linear elastic deformation region was extracted using Equations (17) and (18). $k'_1$=0.007909±0.000223, $k'_2$=0.000107±0.000005, and k=62.27±1.76 N/m.

FIGS. 9A and 9B compare the contact stiffness and web tension distribution using the NCR method and the GCSM method while the webs were tensioned by the 2.34 kg and 2.85 kg hanging masses, respectively. The environmental conditions during the measurements for the data of FIG. 9A were 102.67 kPa air pressure, 21° C. air temperature, and 68% relative humidity resulting in a calculated air density of 1.208 kg/m³. The root mean square error between the stiffnesses of the seven contact locations by the NCR method and as measured by the GCSM method was 3.00 N m⁻¹. The NCR method measured a web tension distribution with an average tension of 134.49 N/m and a linear variation of tension of ±0.2724, and the GCSM method measured a web tension distribution with an average tension of 139.26 N/m and a linear variation of tension of ±0.2619 with a regression error (Equation (19)) e=2.4594. Since the NCR method did not identify the sign of the linear variation of tension, its value was chosen to have the same sign as that from the GCSM method for the plot in FIG. 9A. The discrepancies of the average tension, the maximum tension, and the minimum tension between two methods were solved to be 3.43%, 2.62%, and 4.78%, respectively. The ratio of cross-span tension variation to average tension ($2\sigma$) was 54.48%. This amount of variation could significantly affect the performance of printed electronics devices and was present despite best effects at web alignment. In addition, observations showed the edge effect of contact stiffness agreed with theory.

FIG. 9B shows the comparison of contact stiffness and web tension distribution using the NCR and GCSM methods with the 2.85 kg hanging mass. The environmental conditions for these measurements were 101.84 kPa air pressure, 21° C. air temperature, and 76% relative humidity with a calculated air density of 1.198 kg/m 3. The measured resonance frequencies were $f_{11}$=49.01±0.06 Hz and $f_{12}$=62.16±0.55 Hz The root mean square error between the contact stiffness solved by the NCR method and the GCSM method was 15.84 N/m. The average tension and the linear variation of tension measured by the NCR method were 176.59 N/m and ±0.3602, respectively, while the average tension and the linear variation of tension measured by the GCSM method were 211.84 N/m and ±0.4542, respectively, with a regression error (Equation (19)) e=12.6698. The discrepancies of average tension, maximum tension, and minimum tension between the two methods were 16.64%, 28.25%, and 2.34%, respectively.

High contact stiffness at $X_3$=±45.72 mm was observed with the GCSM method on the web. The average stress measured by the NCR method was 139.0 MPa, which was larger than the yield strength of the PET web. The web likely underwent local plastic elongation along the $x_1$ direction. Local plastic elongation reduces the local web areal mass density and the local web thickness. By examining Equations (6)-(9), it can be shown that the resonance frequencies slightly increase when the global web areal mass density is slightly reduced due to the local plastic elongation. Hence, the NCR method slightly overpredicted the average tension by Equations (10) and (12). The GCSM method used local contact stiffnesses extracted by the Von Kaman theory as shown in Equations (18) and (19). The reduced local web thickness increased the predicted linear contact stiffness and over predicted the web tension. Since the contact stiffness was measured in limited locations, the local plastic elongation affected the GCSM method more than the NCR method in areas where local plastic elongation had occurred. Without including the two local anomalously high contact stiffnesses in FIG. 9B, the average tension is 175.33 N/m, the linear variation of tension is 0.2894, and e=2.9621. Compared with the results by the NCR method, the discrepancies of average tension, maximum tension, and minimum tension between the two methods was reduced to 0.72%, 5.88%, and 10.27% when excluding the two anomalously high contact stiffness measurements.

Whereas the tests reported above were performed on static webs, and should be apparent that the NCR and GCSM methods can also be used for moving webs so long as the transport (line) speeds of the webs are much smaller than their critical transport speed. As the transport speed of a web approaches its critical transport speed, resonance frequencies drop down to zero.

The NCR method was utilized for the in-line test performed with the commercial R2R system to demonstrate the performance of the NCR method in a realistic manufacturing environment. For this test, single location measurements were performed at different transport speeds over two different spans on the R2R system. The environmental conditions during the measurements are 102.71 kPa air pressure, 21° C. air temperature, 43% humidity, and an air density of 1.212 kg/m³. The frequency was swept between 40 Hz and 100 Hz to measure resonances in span 1 and between 140 Hz and 200 Hz to measure resonances in span 2.

The in-line tests were performed at transport speeds of 0 (i.e., stationary), 0.98 to 1.26, and 1.93 to 2.24 m min$^{-1}$ in span 1, and 0 (i.e., stationary), 1.07 to 1.31, and 1.85 to 2.22 m min$^{-1}$ in span 2. All of the transport speeds (with the exception of stationary) are within a range of transport speeds typical for flexible printed electronics manufacturing. Normalized transport speed was defined as the ratio of the transport speed to the critical transport speed. The maximum tested transport speed of about 2 m min' was much less than the critical transport speeds of the web, which were estimated to be between 53.57 m sec$^{-1}$ and 55.89 m sec$^{-1}$ for span 1 and between 47.32 m sec$^{-1}$ and 47.48 m sec$^{-1}$ for span 2, indicating it was safe to neglect the effect of web transport speed in the NCR method during the tests. The measured stationary tension of the web in span 1 was significantly smaller than the measured tension while the web was moving. It was hypothesized that this was the effect of the motion of the unwind and rewind motors on the web tension distribution. When the web started to move, the resistance by frictions between the web and rollers changed and led to tension variations in some spans.

Figure 10A:
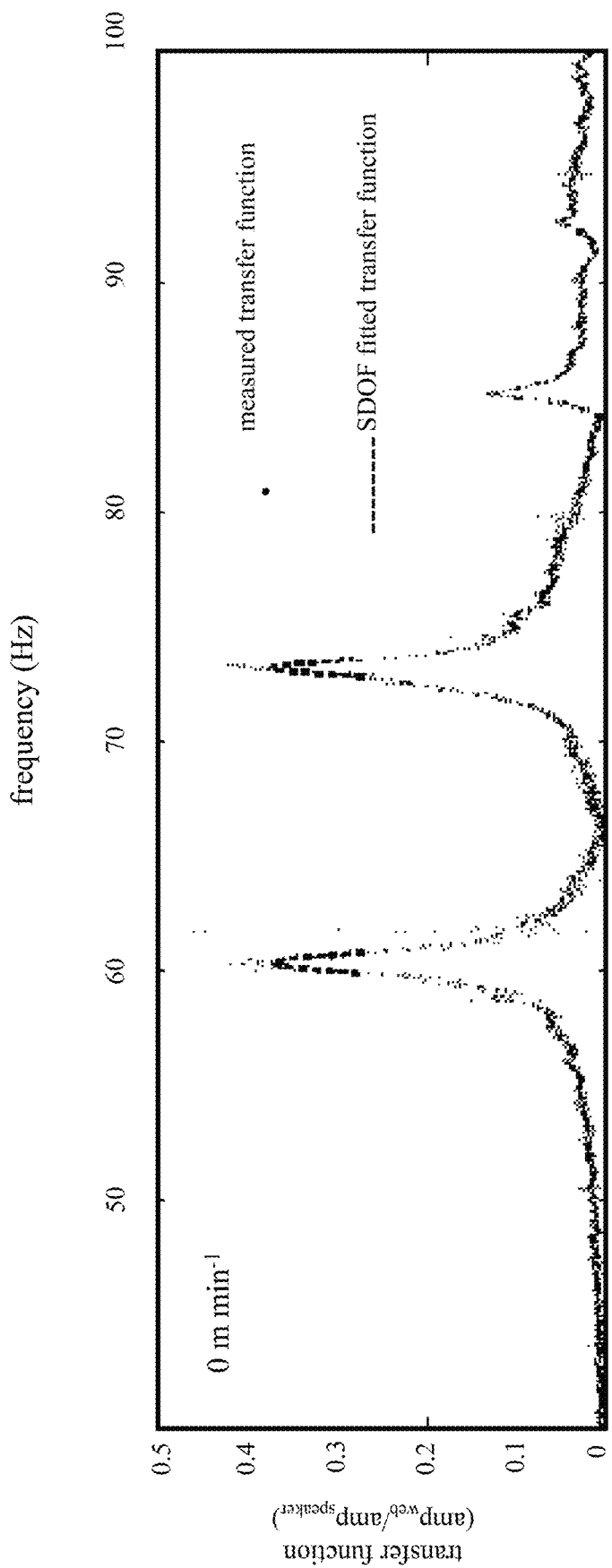
FIGS. 10A, 10B, and 10C are graphs plotting frequency response functions obtained for a web of a commercial R2R system when utilizing a measuring system of the type represented in FIG. 3.
Figure 10B:
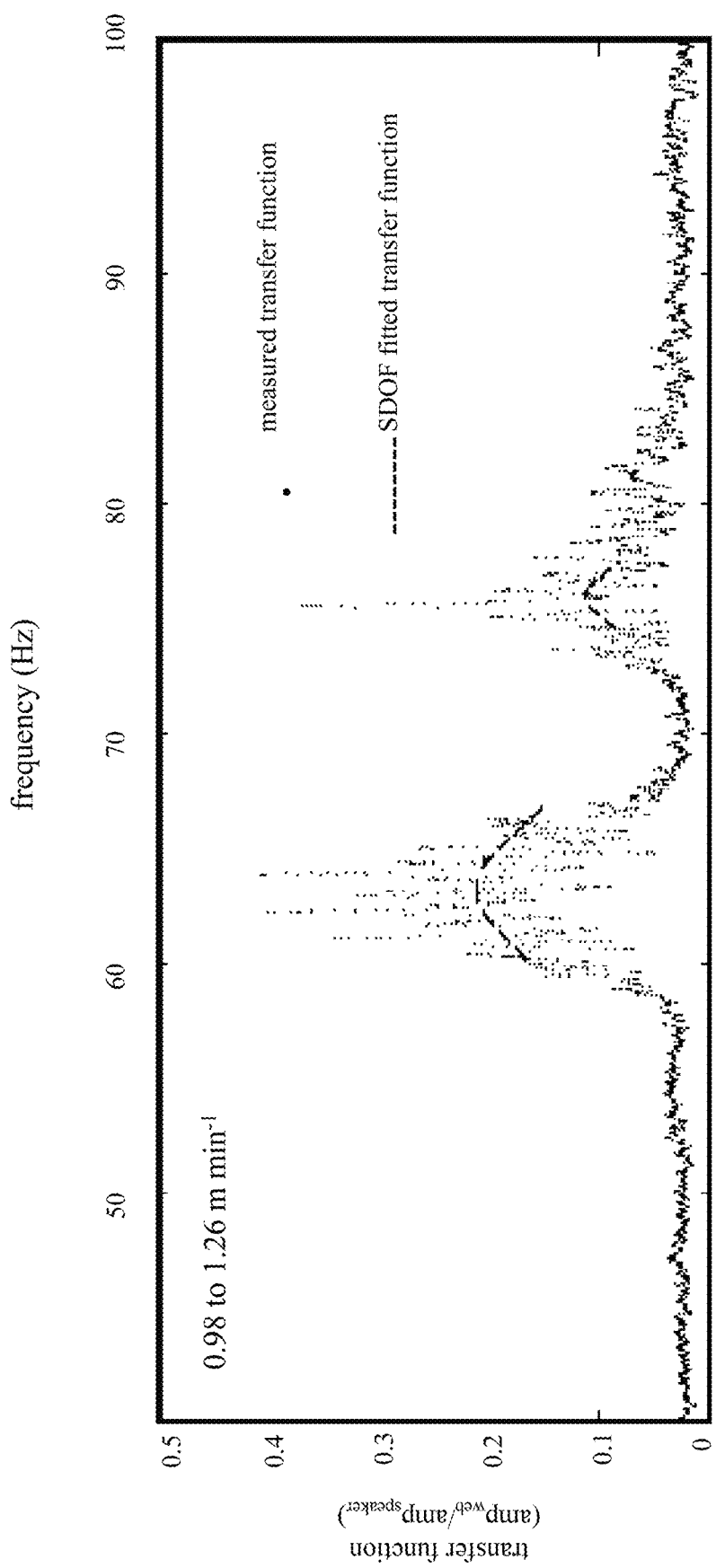
Figure 10C:
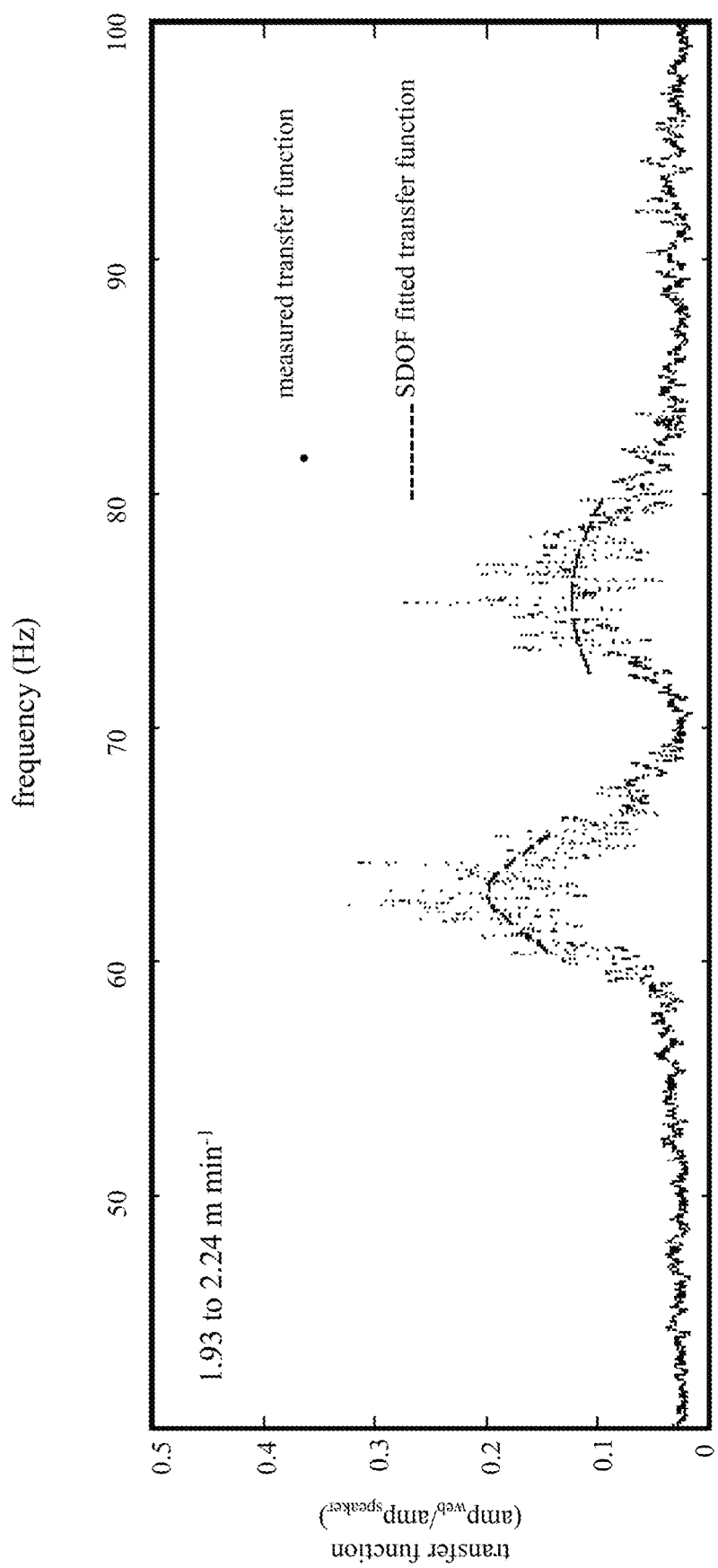

FIGS. 10A through 10C show the transfer function and the SDOF fittings used to extract resonance frequencies at transport speeds set to 0, 1 m min$^{-1}$, and 2 m min$^{-1}$, respectively. The actual transport speeds fluctuated by up to 0.26 m min$^{-1}$ when the web was moving. The transfer functions of the moving web were noisier than those of the stationary web. Several probable causes were proposed for this noise. One was the effect of nonuniformity and roughness of the web surface on the output of the laser sensor. As the web moved, imperfections in the web surface could be falsely detected as web deflection. Another possible cause was noise from the motor driving the web being transmitted through the web causing it to vibrate. Such spurious vibrations could be detected by the laser sensor and captured in the data analysis. Yet another possible source of noise is variation in web tension induced by the unwind and rewind motors as they rotate. Ultimately, the noise did not prevent the NCR method from correctly identifying the web's resonance frequencies and therefore was not an impediment to implementing the NCR method.

Table 2 of FIG. 12 contains results of the in-line measurements of the web tension distributions in the two spans of the R2R system. The cross-span linear variation of tension was negligible in span 2, but varied by up to 35.58% in span 1, showing that different spans of a R2R system can have different variations of tension. The average tension was between 21.46% and 28.29% smaller in span 2 compared to span 1. When the linear variation of tension was small, $\sigma^2$ had a small negative value. This was caused by neglecting higher order variation of tension and errors in fitting and measurements. However, this did not significantly affect the use of the NCR method as it was reasonable to approximate cases with small negative $\sigma^2$ values as having uniform tension distribution.

From the investigations and tests reported above, it was evident that nonuniform web tension distributions in R2R processes can lead to nonuniform device performance across the width of a web. Both the NCR method and the GCSM method were demonstrated to measure the average tension and the linear variation of tension in a web (from which, alternatively or in addition, the average stress and linear variation of stress in the web can be calculated based on the cross-section of the web). In reference to the R2R system 10 represented in FIG. 1, the average tension and linear variation of tension measurements provided by the NCR and GC SM methods can be used as feedback to the control system 16 so that the control system 16 may be used to control the tension distribution across the width of the web 12 using various known or yet to be developed techniques, such as speeding up, slowing down, and/or reorienting one or more of the rollers 14 (for example, raising, lowering, and/or changing the axial orientation of either or both rollers 14), applying and/or causing additional tensile force to be applied to the web 12 at one or more locations across the width of the web 12, as a nonlimiting example, contacting the web 12 with one or more additional rollers located upstream, downstream, or between the rollers 14. The NCR and GC SM methods were inexpensive to implement and adaptable to different spans with different web path flexibly without the need for recalibration. From the investigations and tests, the following conclusions were made:

Increasing linear variation of tension reduces and increases, respectively, the resonance frequencies $f_{11}$ and $f_{12}$, which are tightly clustered in vacuo with uniform tension distribution;

The linear variation of tension coupled symmetric and antisymmetric basis functions.

The NCR method with a closed-form expression successfully measured average tension and its linear variation by the lowest resonance frequencies.

The local contact stiffness close to the free edges of a web is smaller than its central region, such that the web deforms more with a contact force at its edge than with the same contact force at its central region;

Nonuniform tension distribution changes the contact stiffness profile to asymmetric at its cross-span center;

The GCSM method successfully measured the average tension and its linear variation from local contact stiffness by nonlinear regression.

The NCR method and the GCSM method were experimentally cross-validated with 3.43% discrepancy in the average tension and 4.12% discrepancy in the linear variation of tension when there was no local plastically elongation.

The NCR method was successfully demonstrated with in-line measurements of tension distribution in spans of a commercial R2R system under three different transport speeds.

Different spans in the same R2R system can have different average tensions and different linear variations of tension.

As previously noted above, though the foregoing detailed description describes certain aspects of one or more particular embodiments of the invention and investigations associated with the invention, alternatives could be adopted by one skilled in the art. For example, systems capable of use with the invention could differ in appearance and construction from the embodiments described herein and shown in the drawings, functions of certain components could be performed by components of different construction but capable of a similar (though not necessarily equivalent) function, process parameters could be modified, and appropriate materials could be substituted for those noted. As such, and again as was previously noted, it should be understood that the invention is not necessarily limited to any particular embodiment described herein or illustrated in the drawings.

The invention claimed is:

1. A system for monitoring tension distribution across a width of a web in a roll-to-roll system, the roll-to-roll system comprising the web, at least first and second rollers between which the web travels in a longitudinal direction of the web, tension inducing means for inducing tension in the web in the longitudinal direction thereof, and fabricating means for fabricating printed devices on a surface of a flexible substrate of the web, the system comprising:

means for inducing deflection in the web between the first and second rollers, the system being operable to determine an average tension and linear variation of tension present in the flexible substrate resulting from a nonuniform tension distribution induced in the flexible substrate between the first and second rollers; wherein:

the system is operable to determine the average tension and the linear variation of tension while the deflection inducing means contacts the web;

the deflection inducing means applies at least two predetermined and constant force levels that are applied in sequence to the web; and for each of the force levels, the deflection inducing means is applied at different locations across the width of the web.

2. The system according to claim 1, the system comprising:

a second device that detects deflection of the web in a transverse direction that is normal to the surface of the flexible substrate; and processor means that uses a tensioned Kirchhoff plate model to derive local contact stiffnesses of the web across the width thereof and calculate the average tension and the linear variation of tension based on the deflection of the web.

3. The system according to claim 1, wherein the deflection inducing means contacts the web at a level of force that does not plastically deform the flexible substrate.

4. The system according to claim 1, wherein the web is in and contacted by a fluid between the first and second rollers.

5. The system according to claim 1, wherein the web is in a vacuum between the first and second rollers.

6. The system according to claim 1, wherein the average tension and the linear variation of tension are determined without instrumented rollers.

7. The system according to claim 1, further comprising means for controlling the tension induced in the web to increase uniformity of the tension distribution present in the flexible substrate between the first and second rollers.

8. A method of monitoring tension distribution across a width of a web in a roll-to-roll process, the method comprising:

causing the web to travel between first and second rollers in a longitudinal direction of the web;

inducing tension in the web in the longitudinal direction thereof such that tension is present in a flexible substrate of the web between the first and second rollers; and operating the system to determine an average tension and linear variation of tension present in the flexible substrate resulting from the tension induced in the web inducing a nonuniform tension distribution in the flexible substrate between the first and second rollers, the system comprising means for inducing deflection in the web between the first and second rollers; wherein:

the system determines the average tension and the linear variation of tension while the deflection inducing means contacts the web;

the system determines the average tension and the linear variation of tension by the deflection inducing means applying at least two predetermined and constant force levels that are applied in sequence to the web; and for each of the force levels, the deflection inducing means is applied at different locations across the width of the web.

9. The method according to claim 8, the method comprising:

detecting deflection of the web in a transverse direction that is normal to a surface of the flexible substrate; and using a tensioned Kirchhoff plate model to derive local contact stiffnesses of the web across the width thereof and calculate the average tension and the linear variation of tension based on the deflection of the web.

10. The method according to claim 8, wherein the deflection inducing means contacts the web at a level of force that does not plastically deform the flexible substrate.

11. The method according to claim 8, wherein the web is in and contacted by a fluid between the first and second rollers.

12. The method according to claim 8, wherein the web is in a vacuum between the first and second rollers.

13. The method according to claim 8, wherein the average tension and the linear variation of tension are determined without instrumented rollers.

14. The method according to claim 8, further comprising controlling the tension induced in the web to increase uniformity of the tension distribution present in the flexible substrate between the first and second rollers.

15. The method according to claim 8, further comprising fabricating one or more printed devices on a surface of a flexible substrate of the web, wherein the printed devices are chosen from the group consisting of electronic, optical, and optoelectronic devices.

16. The method according to claim 15, wherein the printed devices are chosen from the group consisting of thin film transistors, supercapacitors, organic light emitting diodes, solar cells, antennas, and sensors.

\* \* \* \* \*